(12) United States Patent
Jiang (10) Patent No.: US 10,802,349 B2
(45) Date of Patent: Oct. 13, 2020

(54) FLEXIBLE LIQUID CRYSTAL DISPLAY PANEL

(71) Applicant: Wuhan China Star Optoelectronics Technology Co., Ltd., Wuhan (CN)

(72) Inventor: He Jiang, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/308,825

(22) PCT Filed: Nov. 2, 2018

(86) PCT No.: PCT/CN2018/113632
§ 371 (c)(1),
(2) Date: Dec. 11, 2018

(87) PCT Pub. No.: WO2020/042344
PCT Pub. Date: Mar. 5, 2020

(65) Prior Publication Data
US 2020/0073164 A1 Mar. 5, 2020

(30) Foreign Application Priority Data
Aug. 31, 2018 (CN) .......................... 2018 1 1014734

(51) Int. Cl.
*G02F 1/1339* (2006.01)
*G02F 1/1335* (2006.01)
(Continued)

(52) U.S. Cl.
CPC .... *G02F 1/13394* (2013.01); *G02F 1/133305* (2013.01); *G02F 1/133512* (2013.01);
(Continued)

(58) Field of Classification Search
CPC .......... G02F 1/13394; G02F 1/133305; G02F 1/133512; G02F 1/1334; G02F 1/133509; G02F 1/1337; G02F 1/133723; G02F 2001/13398; G02F 2001/133715; G02F 2001/133726; G02F 2201/086; G02F 2201/08; G02F 2202/28; G02B 5/208; G02B 5/283; C09K 19/3804; C09K 19/38
See application file for complete search history.

(56) References Cited

U.S. PATENT DOCUMENTS

2012/0249940 A1* 10/2012 Choi ................. G02F 1/133753
349/123
2019/0101781 A1* 4/2019 Cao ....................... C01B 32/198

OTHER PUBLICATIONS

English translation of Chinese Patent Application Publication No. CN 108957864. Downloaded from WIPO at https://patentscope.wipo.int/search/en/search.jsf on Nov. 19, 2019; translation provided by Google Translate function on site. (Year: 2018).*

* cited by examiner

*Primary Examiner* — Angela K Davison (57) ABSTRACT

A flexible liquid crystal display panel is provided. The flexible liquid crystal display panel includes a color filter substrate and a plurality of polymer walls. The color filter substrate includes a second glass substrate, a light-shielding layer and a second flexible substrate, and the light-shielding layer is disposed between the second glass substrate and the second flexible substrate. The polymer walls are disposed between the array substrate and the color filter substrate. A width of each polymer wall is equal to a width of each light transmission portion.

9 Claims, 4 Drawing Sheets (51) Int. Cl.
*G02F 1/1333* (2006.01)
*G02F 1/1334* (2006.01)

(52) U.S. Cl.
CPC .. *G02F 1/1334* (2013.01); *G02F 2001/13398* (2013.01); *G02F 2201/086* (2013.01); *G02F 2202/28* (2013.01)

FIG. 1

PRIOR ART

FLEXIBLE LIQUID CRYSTAL DISPLAY PANEL

RELATED APPLICATIONS

This application is a National Phase of PCT Patent Application No. PCT/CN2018/113632 having International filing date of Nov. 2, 2018, which claims the benefit of priority of Chinese Patent Application No. 201811014734.X filed on Aug. 31, 2018. The contents of the above applications are all incorporated by reference as if fully set forth herein in their entirety.

FIELD AND BACKGROUND OF THE INVENTION

The present invention relates to the field of display technology, especially to a flexible liquid crystal display panel.

BACKGROUND OF INVENTION

Flexible liquid crystal display panels have the advantages of lightness, thinness, foldability and flexibility, and are widely used in wearable displays, foldable mobile phones, curved televisions, and military applications. Generally, to keep uniformity of thicknesses between flexible substrates, polymer walls are disposed in the flexible liquid crystal display panel. The polymer walls can also perform a supporting function for stability such that an effectiveness of high quality of displaying is achieved.

However, during the formation of the polymer walls, an employed ultraviolet light is strongly reflected by a glass substrate and re-enters the flexible substrate to make a width of each polymer wall close to the flexible substrate be greater than a width of each light transmission portion of the mask such that light of the displaying region is blocked and an aperture ratio is reduced.

Therefore, it is necessary to provide a flexible liquid crystal display panel to solve the issue of the prior art.

SUMMARY OF THE INVENTION

An objective of the present invention is to provide a flexible liquid crystal display panel that can improve an aperture ratio.

To solve the above technical issue, the present invention provides a flexible liquid crystal display panel, comprising:
an array substrate, disposed opposite to a color filter substrate, and comprising a first flexible substrate;
the color filter substrate, comprising a second glass substrate, a light-shielding layer and second flexible substrate, and the light-shielding layer located between the second glass substrate and the second flexible substrate; and
a plurality of polymer walls, disposed between the array substrate and the color filter substrate, wherein the polymer walls are acquired by employing ultraviolet light to irradiate a liquid crystal material through a mask including a plurality of light transmission portions to polymerize reactive monomers in the liquid crystal material, wherein positions of the light transmission portions correspond to positions of the polymer walls, a width of each polymer wall is equal to a width of each light transmission portion, and the liquid crystal material comprises liquid crystal molecules, the reactive monomers and photoinitiators;
wherein the light-shielding layer is a light-shielding film or a light-absorbing film, a range of a thickness of the light-shielding layer is 30 μm-120 μm.

In the flexible liquid crystal display panel of the present invention, the light-shielding layer is light-shielding film, and the light-shielding layer is doped with a light-absorbing material.

In the flexible liquid crystal display panel of the present invention, a cross sectional structure of the light-shielding layer comprises at least one light-shielding film and at least one light-absorbing film.

In the flexible liquid crystal display panel of the present invention, a cross sectional structure of the light-shielding layer comprises a light-shielding film and light-absorbing film; the light-absorbing film is located between the second flexible substrate and the light-shielding film, and the light-shielding film is located on the second glass substrate.

In the flexible liquid crystal display panel of the present invention, a cross sectional structure of the light-shielding layer comprises a light-shielding film and two light-absorbing films; one of the light-absorbing films is located between the second glass substrate and the light-shielding film, and the other of the light-absorbing films is located between the light-shielding film and the second flexible substrate.

In the flexible liquid crystal display panel of the present invention, a material of the light-shielding film is a black matrix material.

In the flexible liquid crystal display panel of the present invention, the light-shielding film is a light-shielding adhesive body.

In the flexible liquid crystal display panel of the present invention, a top surface and a bottom surface of the light-shielding adhesive body are disposed with a first adhesive layer and a second adhesive layer respectively, the light-shielding adhesive body is adhered to the second flexible substrate through the first adhesive layer, the light-shielding adhesive body is adhered to the second glass substrate through the second adhesive layer, a viscosity of the first adhesive layer is less than a viscosity of the second adhesive layer.

In the flexible liquid crystal display panel of the present invention, a range of a thickness of the light-shielding layer is 50 μm-120 μm.

To solve the above technical issue, the present invention provides a flexible liquid crystal display panel, comprising:
an array substrate, disposed opposite to a color filter substrate, and comprising a first flexible substrate;
the color filter substrate, comprising a second glass substrate, a light-shielding layer and a second flexible substrate, and the light-shielding layer disposed between the second glass substrate and the second flexible substrate; and
a plurality of polymer walls, disposed between the array substrate and the color filter substrate, wherein the polymer walls are acquired by employing ultraviolet light to irradiate a liquid crystal material through a mask including a plurality of light transmission portions to polymerize reactive monomers in the liquid crystal material, wherein positions of the light transmission portions correspond to positions of the polymer walls, a width of each polymer wall is equal to a width of each light transmission portion, and the liquid crystal material comprises liquid crystal molecules, the reactive monomers and photoinitiators.

In the flexible liquid crystal display panel of the present invention, the light-shielding layer is a light-shielding film or a light-absorbing film.

In the flexible liquid crystal display panel of the present invention, the light-shielding layer is a light-shielding film, and the light-shielding layer is doped with a light-absorbing material.

In the flexible liquid crystal display panel of the present invention, a cross sectional structure of the light-shielding layer comprises at least one light-shielding film and at least one light-absorbing film.

In the flexible liquid crystal display panel of the present invention, a cross sectional structure of the light-shielding layer comprises a light-shielding film and a light-absorbing film; the light-absorbing film is located between the second flexible substrate and the light-shielding film, and the light-shielding film is located on the second glass substrate.

In the flexible liquid crystal display panel of the present invention, a cross sectional structure of the light-shielding layer comprises light-shielding film and two light-absorbing films; one of the light-absorbing films is located between the second glass substrate and the light-shielding film, and the other of the light-absorbing films is located between the light-shielding film and the second flexible substrate.

In the flexible liquid crystal display panel of the present invention, a material of the light-shielding film is a black matrix material.

In the flexible liquid crystal display panel of the present invention, the light-shielding film is a light-shielding adhesive body.

In the flexible liquid crystal display panel of the present invention, a top surface and a bottom surface of the light-shielding adhesive body are disposed with a first adhesive layer and a second adhesive layer respectively, the light-shielding adhesive body is adhered to the second flexible substrate through the first adhesive layer, the light-shielding adhesive body is adhered to the second glass substrate through the second adhesive layer, and a viscosity of the first adhesive layer is less than a viscosity of the second adhesive layer.

In the flexible liquid crystal display panel of the present invention, a range of a thickness of the light-shielding layer is 30 μm-120 μm.

In the flexible liquid crystal display panel of the present invention, a range of a thickness of the light-shielding layer is 50 μm-120 μm.

The flexible liquid crystal display panel of the present invention, by disposing the light-shielding layer between the glass substrate on a side of the color filter substrate and the flexible substrate, prevents ultraviolet light reflected by the glass substrate from entering the flexible substrate, avoids blocking of light due to the polymer walls having increased width, and improves the aperture ratio.

DESCRIPTION OF SPECIFIC EMBODIMENTS OF THE INVENTION

Each of the following embodiments is described with appending figures to illustrate specific embodiments of the present invention that are applicable. The terminologies of direction mentioned in the present invention, such as "upper", "lower", "front", "rear", "left", "right", "inner", "outer", "side surface", etc., only refer to the directions of the appended figures. Therefore, the terminologies of direction are used for explanation and comprehension of the present invention, instead of limiting the present invention. In the figures, units with similar structures are marked with the same reference numerals.

Figure 1:
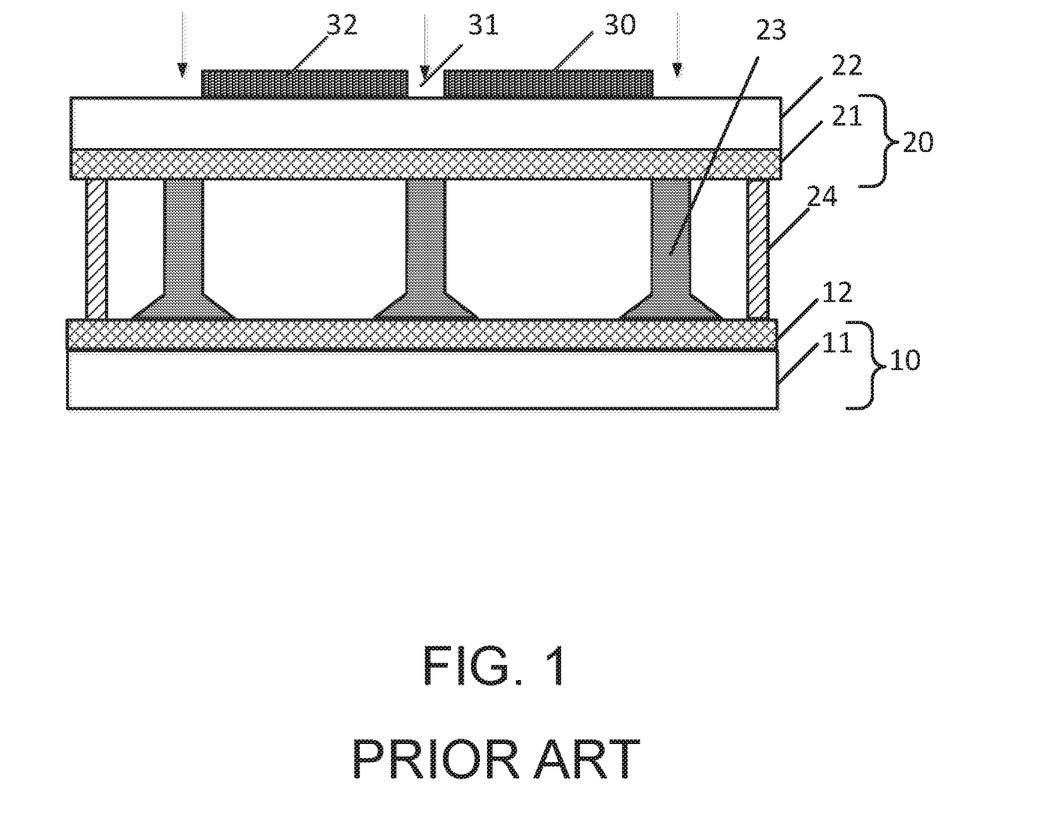
FIG. 1 is a structurally schematic view of a conventional flexible liquid crystal display panel during a manufacturing process thereof.

With reference to FIG. 1, a method for manufacturing a conventional flexible liquid crystal display panel includes step S101, step S102, step S103, step S104 and step S105.

The step S101 includes manufacturing an array substrate 20.

For example, the step includes manufacturing a first flexible substrate 21 under a first glass substrate 22. For example, a material of polyimide (PI) is coated under the first glass substrate 22, and then is cured to form the first flexible substrate 21.

The step also includes manufacturing a thin film transistor (TFT) layer under the first flexible substrate 21.

The step S102 includes manufacturing a color filter substrate 10.

For example, the step includes manufacturing a second flexible substrate 12 on a second glass substrate 11. For example, a material of polyimide (PI) is coated on the second glass substrate 11, and then is cured to form the second flexible substrate 12.

The step can also include manufacturing a color filter layer and a transparent conductive layer on the second flexible substrate 12.

The step S103 includes filling a liquid crystal material between the array substrate and the color filter substrate.

For example, the liquid crystal material is filled between the array substrate 20 and the color filter substrate 10. The liquid crystal material includes liquid crystal molecules, reactive monomers and photoinitiators.

The step S104 includes pairing and bonding the array substrate to the color filter substrate.

For example, the array substrate 20 and the color filter substrate 10 are paired, and then a sealing glue 24 is coated on peripheries of the array substrate 20 and the color filter substrate 10. The sealing glue 24 is mixed with a spacer material. The sealing glue 24 is cured by irradiation of ultraviolet light and baking such that the array substrate 20 and the color filter substrate 10 are adhered together through the sealing glue 24. The sealing glue 24 performs functions of supporting a liquid crystal cell and forming a thickness of the liquid crystal cell.

The step S105 includes employing ultraviolet light to irradiate the liquid crystal material through a mask to polymerize reactive monomers in the liquid crystal material to form polymer walls.

For example, ultraviolet light is used to irradiate the liquid crystal material through a mask 30, whereby irradiated reactive monomers are polymerized to form polymer walls 23. The mask 30 includes a plurality of light transmission portions 31 and a plurality of non-light transmission portions 32. A width of each polymer wall 23 is greater than a width of each light transmission portion 31. Especially, the width of each polymer wall 23 close to the second flexible substrate 12 is greater than the width of each light transmission portion. A direction of an arrow in FIG. 1 is an irradiating direction of the ultraviolet light. Under irradiation of the ultraviolet light, the photoinitiators produce free radical ions.

The method also includes the following step:

Step S106 includes a laser stripping process, which strips the first glass substrate and the second glass substrate to form a foldable flexible liquid crystal display panel.

For example, by a laser stripping process, the first glass substrate 22 and second glass substrate 11 are stripped off to form the bendable flexible liquid crystal display panel.

It is understood that the method also includes a cutting and modularizing process, for example, attachment of a polarizer, assembly of integrated circuits and a flexible backlight device, etc. to form a final product of the flexible liquid crystal display panel device.

Figure 2:
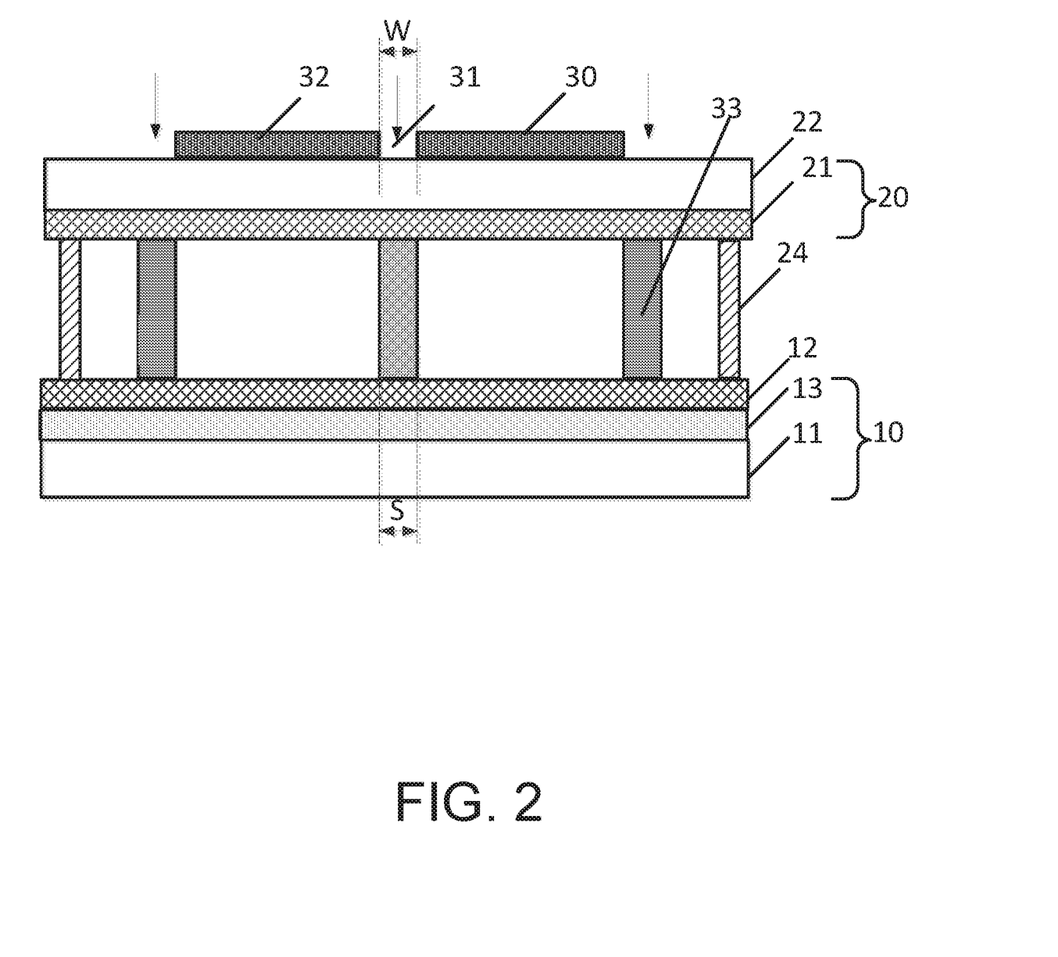
FIG. 2 is a structurally schematic view of a flexible liquid crystal display panel of the present invention during a manufacturing process thereof.

With reference to FIG. 2, a method for manufacturing a flexible liquid crystal display panel of the present invention includes step S201, step S202, step S203, step S204 and step S205.

The step S201 includes manufacturing an array substrate 20.

For example, the step includes manufacturing a first flexible substrate 21 under a first glass substrate 22. For example, a material of polyimide (PI) is coated under the first glass substrate 22, and then is cured to form the first flexible substrate 21.

The step also includes manufacturing TFT layer (not shown in the figures) at the first flexible substrate 21.

The step S202 includes manufacturing a color filter substrate 10.

The step includes a step S2021 including sequentially manufacturing a light-shielding layer and a second flexible substrate on a second glass substrate.

For example, a material of a light-shielding layer is coated on a second glass substrate 11 and then is cured to form a light-shielding layer 13. After that, a material of polyimide (PI) is coated on the light-shielding layer 13 and then is cured to form a second flexible substrate 12.

In an embodiment, the light-shielding layer 13 is a single layer structure, and the light-shielding layer 13 is a light-shielding film or a light-absorbing film. In other words, a material of the light-shielding layer 13 is a light-shielding material or light-absorbing material.

In an embodiment, the light-shielding layer 13 is a light-shielding film, and a material of the light-shielding film is a black matrix material.

In another embodiment, the light-shielding film is a light-shielding adhesive body.

To prevent damages of the flexible substrate during the stripping process, a viscosity of an adhesive layer between the light-shielding adhesive body and the second flexible substrate 12 is less than a predetermined value. For example, a top surface and a bottom surface of the light-shielding adhesive body are disposed with a first adhesive layer and a second adhesive layer respectively. The light-shielding adhesive body is adhered to the second flexible substrate 12 through the first adhesive layer, and the light-shielding adhesive body is adhered to the second glass substrate 11 through the second adhesive layer. A viscosity of the first adhesive layer is less than a viscosity of the second adhesive layer.

When the light-shielding layer 13 is a light-shielding film, the light-shielding layer 13 is doped with a light-absorbing material. A material of the light-shielding layer 13 includes a light-shielding material and a light-absorbing material.

In another embodiment, the light-shielding layer 13 is a multi-layered structure. A cross sectional structure of the light-shielding layer 13 includes at least one light-shielding film and at least one light-absorbing film.

Figure 3:
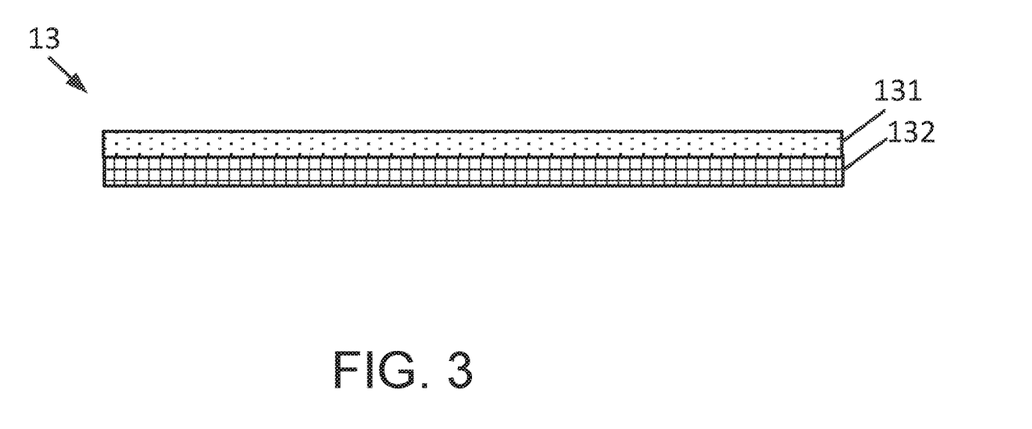
FIG. 3 is a first structurally schematic view of a light-shielding layer of the present invention.

To further reduce reflected light of the second glass substrate, in an embodiment, as shown in FIG. 3, a cross sectional structure of the light-shielding layer 13 includes a light-absorbing film 131 and a light-shielding film 132, and the light-absorbing film 131 is disposed between the second flexible substrate 12 and the light-shielding film 132. That is, the light-absorbing film 131 is close to the second flexible substrate 12, and the light-shielding film 132 is close to the second glass substrate 11, i.e., located on the second glass substrate 11.

Figure 4:
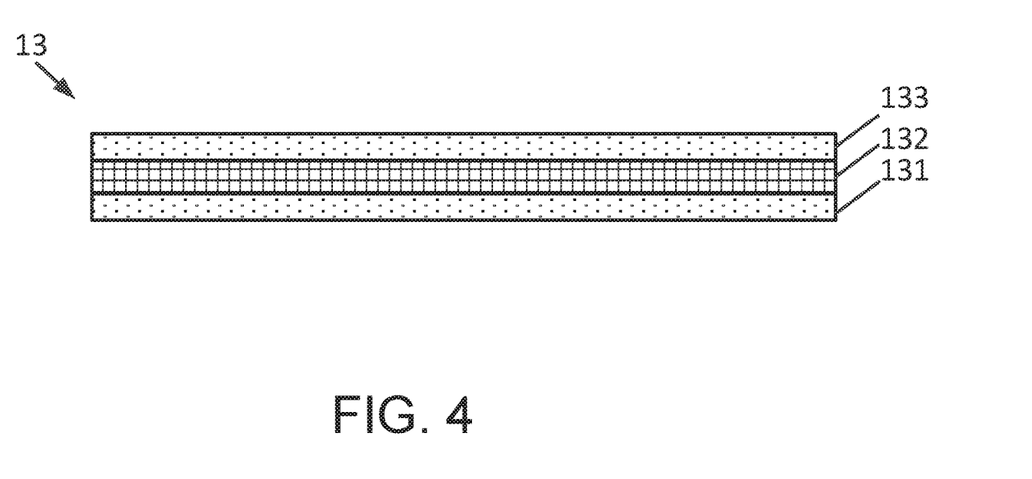
FIG. 4 is a second structurally schematic view of the light-shielding layer of the present invention.

To better reduce reflected light of the second glass substrate, in another embodiment, with reference to FIG. 4, a cross sectional structure of the light-shielding layer 13 includes two light-absorbing films 131, 133 and a light-shielding film 132. The light-shielding film 132 is located between the light-absorbing films 131, 133. One light-absorbing film 131 is close to the second glass substrate 11, and the other light-absorbing film 133 is close to the second flexible substrate 12.

It can be understood that, in other embodiment, a cross sectional structure of the light-shielding layer 13 includes at least two light-absorbing films or at least two light-shielding films.

A range of a thickness of the light-shielding layer 13 is 30 μm-120 μm. It can be understood that when the light-shielding layer 13 is a multi-layer structure, a thickness of the light-shielding layer 13 is a sum of thicknesses of all of the layers. Preferably, a range of a thickness of the light-shielding layer 13 is 50 μm-120 μm. More preferably, the range is 100-120 μm. Of course, it can be understood that the light-shielding layer 13 is easily stripped from the second flexible substrate 12.

The step can also include disposing a color filter layer and a transparent conductive layer (not shown in figures) on the second flexible substrate 12.

The step S203 includes filling a liquid crystal material between the array substrate and the color filter substrate.

For example, a liquid crystal material is filled between the array substrate 20 and the color filter substrate 10. The liquid crystal material includes liquid crystal molecules, reactive monomers and photoinitiators.

The step S204 includes pairing and bonding the array substrate and the color filter substrate.

For example, the array substrate 20 and the color filter substrate 10 are paired, and then a sealing glue 24 is coated on peripheries of the array substrate 20 and the color filter substrate 10. The sealing glue 24 is mixed with a spacer material. The sealing glue 24 is cured by irradiation of ultraviolet light and baking such that the array substrate 20 and the color filter substrate 10 are adhered together through the sealing glue 24. The sealing glue 24 performs functions of supporting a liquid crystal cell and forming a thickness of the liquid crystal cell.

The step S205 employs ultraviolet light to irradiate the liquid crystal material through a mask to polymerize reactive monomers in the liquid crystal material to form polymer walls.

For example, ultraviolet light is used to irradiate the liquid crystal material through a mask 30; irradiated reactive monomers are polymerized to form polymer walls 33 such that a flat flexible liquid crystal display panel is formed. The mask 30 includes a plurality of light transmission portions 31 and a plurality of non-light transmission portions 32. Positions of the polymer walls 33 correspond to positions of the light transmission portions 31. A width S of each polymer wall 33 is equal to a width W of each light transmission portion 31. Under irradiation of the ultraviolet light, the photoinitiators produce free radical ions. A range of energy of the ultraviolet light is 10-100 mJ/mW.

The method also includes the following step:

Step S206 includes a laser stripping process, which strips the first glass substrate and the second glass substrate to form a bendable flexible liquid crystal display panel.

For example, by the laser stripping process, the first glass substrate 22 is stripped from the first flexible substrate 21, and the second glass substrate 11 and the light-shielding layer 13 are stripped from the second flexible substrate 12 to form the bendable flexible liquid crystal display panel.

It is understood that the method also includes a cutting and modularizing process, for example, attachment of a polarizer, assembly of integrated circuits and a flexible backlight device, etc. to form a final product of the flexible liquid crystal display panel device.

The flexible liquid crystal display panel of the present invention, by disposing the light-shielding layer between the glass substrate on a side of the color filter substrate and the flexible substrate, prevents ultraviolet light reflected by the glass substrate from entering the flexible substrate, avoids blocking of light due to increased width of the polymer walls, and improves the aperture ratio.

Figure 5:
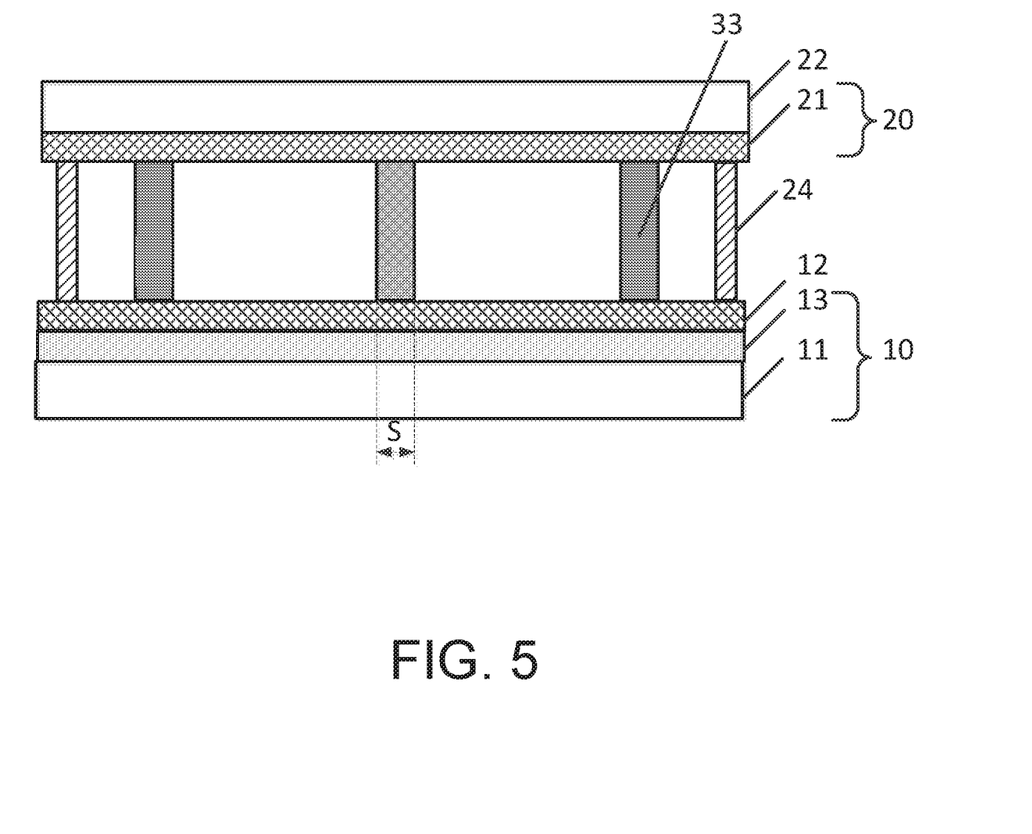
FIG. 5 is a structurally schematic view of a flexible liquid crystal display panel of the present invention.

With reference to FIG. 5, the present invention also provides a flexible liquid crystal display panel. The flexible liquid crystal display panel is a flat flexible liquid crystal display panel, and includes an array substrate 20, a color filter substrate 10 and a plurality of polymer walls 33. The array substrate 20 includes a first glass substrate 22 and a first flexible substrate 21 under the first glass substrate 22. The array substrate 20 can also include a TFT layer (not shown in the figures).

The color filter substrate 10 includes a second glass substrate 11, a light-shielding layer 13 and a second flexible substrate 12. The light-shielding layer 12 is located between the second glass substrate 11 and the second flexible substrate 12. The color filter substrate 10 can also include a color filter layer, and a transparent conductive layer (not shown in the figures).

The polymer walls 33 are disposed between the array substrate 10 and the color filter substrate 20. The polymer walls 33 are acquired by employing ultraviolet light to irradiate a liquid crystal material through a mask 30 including a plurality of light transmission portions 31 to polymerize reactive monomers in the liquid crystal material. Positions of the light transmission portions 31 correspond to positions of the polymer walls 33. A width of each polymer wall 33 is equal to a width of each light transmission portions 31. The light transmission portions 31 correspond to positions of edges of pixels.

The liquid crystal display panel of the present invention also includes a liquid crystal layer (not shown in the figures) located between the array substrate 20 and the color filter substrate 10. A thickness of the polymer walls 33 is equal to a thickness of the liquid crystal layer.

In an embodiment, the light-shielding layer 13 is a single layer structure, and the light-shielding layer 13 is a light-shielding film or a light-absorbing film. In other words, a material of the light-shielding layer 13 is a light-shielding material or a light-absorbing material.

In an embodiment, the light-shielding layer 13 is a light-shielding film, and a material of the light-shielding film is a black matrix material.

In another embodiment, the light-shielding film is a light-shielding adhesive body.

To prevent damages of the flexible substrate during the stripping process, a viscosity of an adhesive layer between the light-shielding adhesive body and the second flexible substrate 12 is less than a predetermined value.

A top surface and a bottom surface of the light-shielding adhesive body are disposed with a first adhesive layer and a second adhesive layer respectively. The light-shielding adhesive body is adhered to the second flexible substrate 12 through the first adhesive layer, the light-shielding adhesive body is adhered to the second glass substrate 11 through the second adhesive layer, and a viscosity of the first adhesive layer is less than a viscosity of the second adhesive layer.

When the light-shielding layer 13 is a light-shielding film, the light-shielding layer 13 is doped with a light-absorbing material. A material of the light-shielding layer 13 includes a light-shielding material and a light-absorbing material.

In another embodiment, the light-shielding layer 13 is a multi-layer structure, and a cross sectional structure of the light-shielding layer 13 includes at least one light-shielding film and at least one light-absorbing film.

To further reduce reflected light of the second glass substrate, in an embodiment, as shown in FIG. 3, a cross sectional structure of the light-shielding layer 13 includes a light-absorbing film 131 and a light-shielding film 132, and the light-absorbing film 131 is disposed between the second flexible substrate 12 and the light-shielding film 132. That is, the light-absorbing film 131 is close to the second flexible substrate 12, and the light-shielding film 132 is close to the second glass substrate 11, i.e., located on the second glass substrate 11.

To reduce reflected light of the second glass substrate better, in another embodiment, with reference to FIG. 4, a cross sectional structure of the light-shielding layer 13 includes two light-absorbing films 131, 133 and a light-shielding film 132. The light-shielding film 132 is located between the light-absorbing films 131, 133. One light-absorbing film 131 is close to the second glass substrate 11, and the other light-absorbing film 133 is close to the second flexible substrate 12.

It can be understood that, in other embodiment, a cross sectional structure of the light-shielding layer 13 includes at least two light-absorbing films or at least two light-shielding films.

A range of a thickness of the light-shielding layer 13 is 30 μm-120 μm. It can be understood that when the light-shielding layer 13 is a multi-layer structure, a thickness of the light-shielding layer 13 is a sum of thicknesses of all of the layers. Preferably, a range of a thickness of the light-shielding layer 13 is 50 μm-120 μm. More preferably, the range is 100-120 μm.

The step can also include disposing a color filter layer and a transparent conductive layer (not shown in the figures) on the second flexible substrate 12.

Of course, it is understood that the light-shielding layer 13 is easily stripped from the second flexible substrate 12.

The light-shielding layer disposed between the glass substrate on a side of the color filter substrate and the flexible substrate prevents ultraviolet light reflected by the glass substrate from entering the flexible substrate to overly accumulate the reactive monomers close to the second flexible substrate which can block light due to increased width of the polymer walls, and thus improves the aperture ratio.

The flexible liquid crystal display panel of the present invention, by disposing the light-shielding layer between the glass substrate on a side of the color filter substrate and the flexible substrate, prevents ultraviolet light reflected by the glass substrate from entering the flexible substrate, avoids blocking of light due to increased width of the polymer walls, and improves the aperture ratio.

As described above, although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. A flexible liquid crystal display panel, comprising:
   an array substrate, disposed opposite to a color filter substrate, and comprising a first flexible substrate;
   the color filter substrate, comprising a glass substrate, a light-shielding layer and a second flexible substrate, and wherein the light-shielding layer is located between the glass substrate and the second flexible substrate; and
   a plurality of polymer walls, disposed between the array substrate and the color filter substrate, wherein the polymer walls are acquired by employing ultraviolet light to irradiate a liquid crystal material through a mask including a plurality of light transmission portions to polymerize reactive monomers in the liquid crystal material, wherein positions of the light transmission portions correspond to positions of the polymer walls, a width of each polymer wall is equal to a width of each light transmission portion, and the liquid crystal material comprises liquid crystal molecules, the reactive monomers and photoinitiators;
   wherein a range of a thickness of the light-shielding layer is 30 μm-120 μm;
   wherein a cross sectional structure of the light-shielding layer comprises a light-shielding film and a light-absorbing film; the light-absorbing film is located between the second flexible substrate and the light-shielding film, and the light-shielding film is located on the glass substrate.

2. The flexible liquid crystal display panel as claimed in claim 1, wherein a cross sectional structure of the light-shielding layer further comprises an additional light absorbing film; and the additional light-absorbing film is located between the glass substrate and the light-shielding film.

3. The flexible liquid crystal display panel as claimed in claim 1, wherein a range of a thickness of the light-shielding layer is 50 μm-120 μm.

4. The flexible liquid crystal display panel as claimed in claim 1, wherein the light-shielding film is a light-shielding adhesive body.

5. The flexible liquid crystal display panel as claimed in claim 4, wherein
   a top surface and a bottom surface of the light-shielding adhesive body are disposed with a first adhesive layer and a second adhesive layer respectively, the light-shielding adhesive body is adhered to the second flexible substrate through the first adhesive layer, the light-shielding adhesive body is adhered to the glass substrate through the second adhesive layer, a viscosity of the first adhesive layer is less than a viscosity of the second adhesive layer.

6. A flexible liquid crystal display panel, comprising:
   an array substrate, disposed opposite to a color filter substrate, and comprising a first flexible substrate;
   the color filter substrate, comprising a glass substrate, a light-shielding layer and a second flexible substrate, and wherein the light-shielding layer is disposed between the glass substrate and the second flexible substrate; and
   a plurality of polymer walls, disposed between the array substrate and the color filter substrate, wherein the polymer walls are acquired by employing ultraviolet light to irradiate a liquid crystal material through a mask including a plurality of light transmission portions to polymerize reactive monomers in the liquid crystal material, wherein positions of the light transmission portions correspond to positions of the polymer walls, a width of each polymer wall is equal to a width of each light transmission portion, and the liquid crystal material comprises liquid crystal molecules, the reactive monomers and photoinitiators;
   wherein a cross sectional structure of the light-shielding layer comprises a light-shielding film and a light-absorbing film; the light-absorbing film is located between the second flexible substrate and the light-shielding film, and the light-shielding film is located on the glass substrate.

7. The flexible liquid crystal display panel as claimed in claim 6, wherein a cross sectional structure of the light-shielding layer further comprises an additional light absorbing film; and the additional light-absorbing film is located between the glass substrate and the light-shielding film.

8. The flexible liquid crystal display panel as claimed in claim 6, wherein the light-shielding film is a light-shielding adhesive body.

9. The flexible liquid crystal display panel as claimed in claim 8, wherein a top surface and a bottom surface of the light-shielding adhesive body are disposed with a first adhesive layer and a second adhesive layer respectively, the light-shielding adhesive body is adhered to the second flexible substrate through the first adhesive layer, the light-shielding adhesive body is adhered to the glass substrate through the second adhesive layer, and a viscosity of the first adhesive layer is less than a viscosity of the second adhesive layer.

* * * * *